United States Patent [19]

Kenny

[11] Patent Number: 5,037,250

[45] Date of Patent: Aug. 6, 1991

[54] ROTARY TOOL HOLDER

[75] Inventor: Kevin D. Kenny, Brighton, Mich.

[73] Assignee: Westinghouse Electric Corp., Pittsburgh, Pa.

[21] Appl. No.: 461,699

[22] Filed: Jan. 8, 1990

[51] Int. Cl.$^5$ .............................................. B23B 51/06
[52] U.S. Cl. ......................................... 408/57; 408/56; 408/241 B; 408/72 B; 175/214; 175/220; 279/20
[58] Field of Search .................. 408/56, 57, 59, 72 B, 408/80, 61, 241 B, 113, 238; 279/20; 409/135, 137; 175/214, 207, 208, 220

[56] References Cited

U.S. PATENT DOCUMENTS

| 3,024,030 | 3/1962 | Koch | 279/20 |
| 3,791,660 | 2/1974 | Bostley | 408/59 X |
| 4,557,643 | 12/1985 | Cioci | 408/56 X |
| 4,652,189 | 3/1987 | Mizoguchi | 408/59 X |
| 4,770,570 | 9/1988 | Tsui et al. | 408/72 B X |

FOREIGN PATENT DOCUMENTS 16474  8/1956  Fed. Rep. of Germany ........ 408/56

OTHER PUBLICATIONS

Mechanical Engineering Design, p. 487, 1983.

Primary Examiner—Larry I. Schwartz
Assistant Examiner—Robert Schultz
Attorney, Agent, or Firm—Louis T. Isaf

[57] ABSTRACT

A rotary tool holder of the type including a stationary shell adapted to be reciprocally positioned within a bushing plate and a shaft mounted rotatably within the stationary shell. An annular space is provided between the shaft and the shell and the shell includes an enlarged diameter collar portion proximate one end of the shell and a reduced diameter pilot portion extending from the collar portion to the other end of the shell. The pilot portion is slidably received in the bushing plate and the collar portion receives a pressurized coolant fitting. Needle bearings are provided in the annular space between the shell and the shaft proximate the pilot portion and a pair of annular seals are provided in the annular space between the shell and the shaft proximate the collar portion. The annular seals are positioned on opposite sides of a radial passage formed through the collar portion and through the shaft for communication with a central axial bore in the shaft. Pressurized fluid is delivered through the collar portion and through the radial port in the shaft to the central axial bore in the shaft from when it is delivered to the cutting tool carried by the shaft for delivery through a central bore in the tool to the cutting face where it acts to cool the cutting face and break up and remove chips from the cutting face.

3 Claims, 2 Drawing Sheets

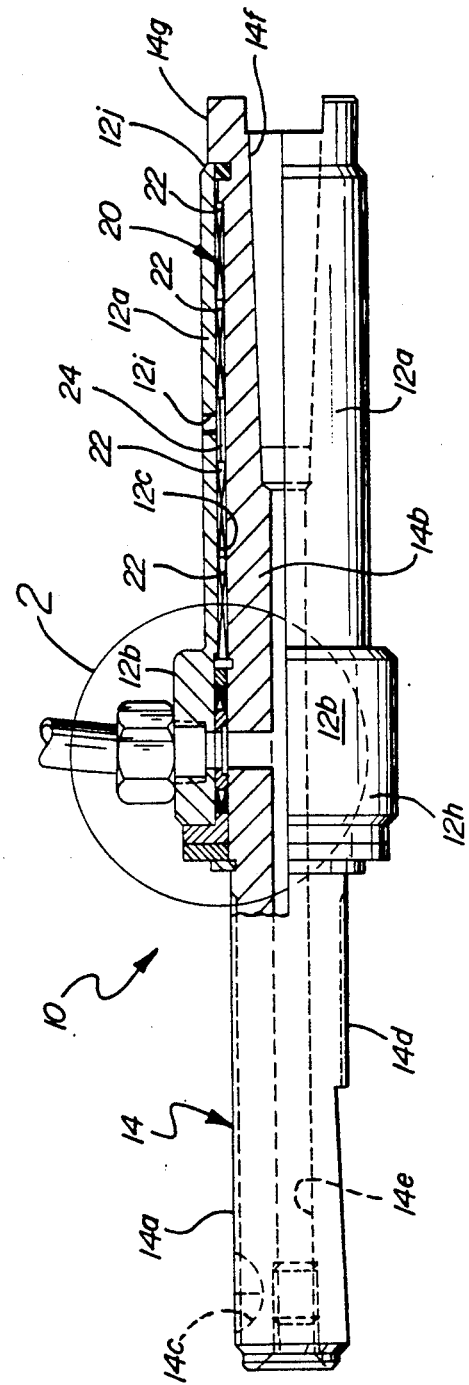
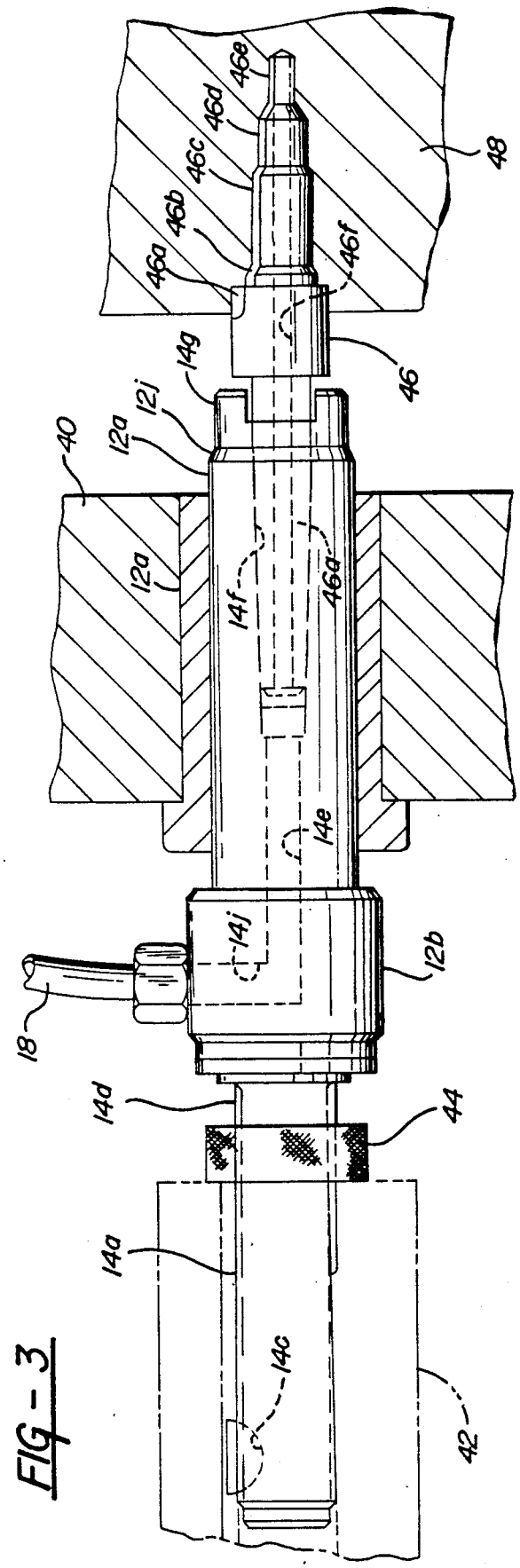
FIG-1
FIG-3

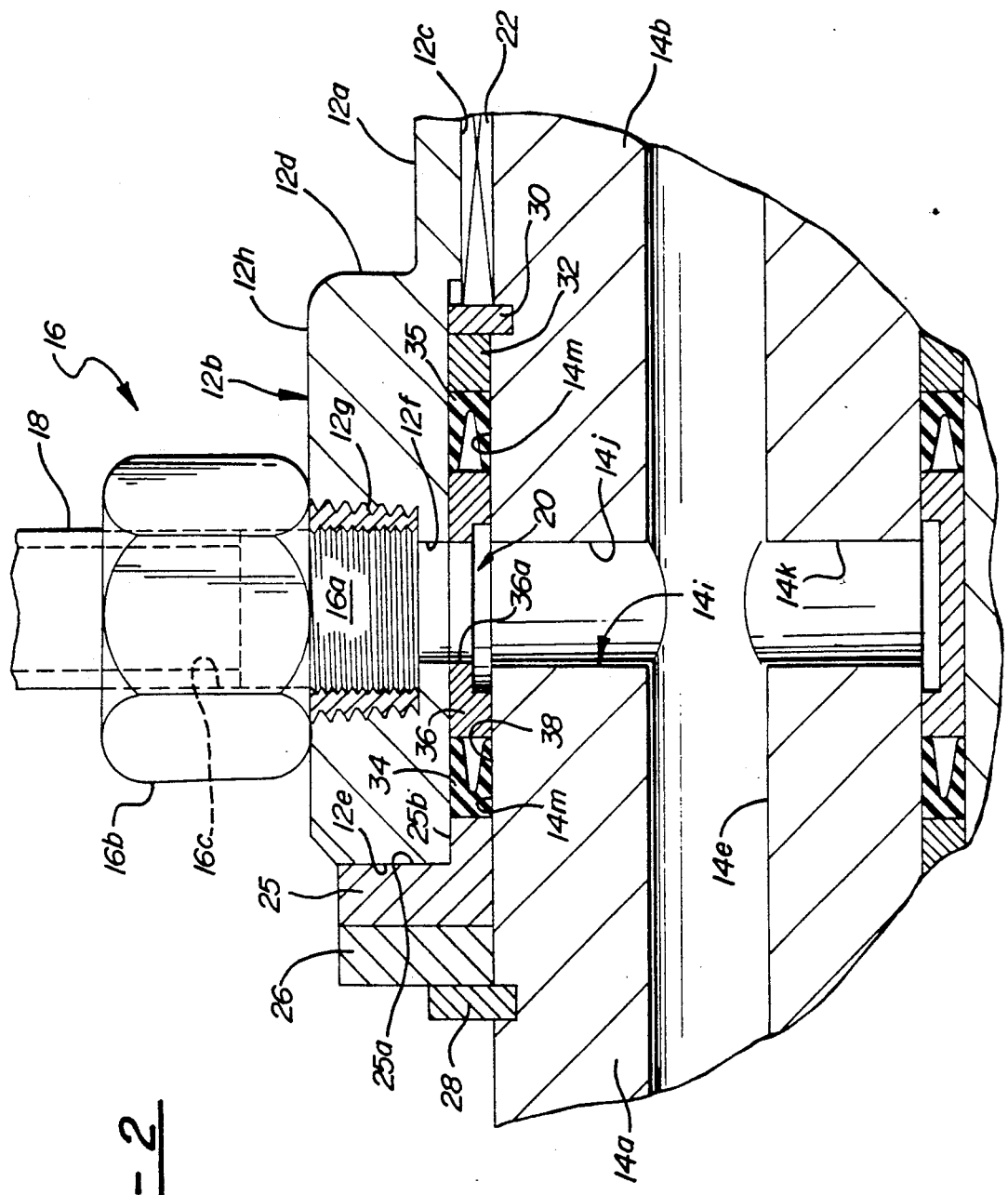

ROTARY TOOL HOLDER

This invention relates to machine tools and more particularly relates to a tool holder for a rotary cutting tool.

Rotary cutting tools, such for example as carbide cutting tools, are commonly used in production machinery such for example as dial index machines and transfer lines. It is important in such production machinery that the rotary tool run absolutely true to the center line of the tool shaft and that adequate means be provided to ensure that the tool runs without overheating and that chips are satisfactorily removed from the cutting face.

Overheating and chip removal can be accomplished by the delivery of a high pressure coolant to the cutting surface through the rotating tool. Prior art attempts to deliver a pressure coolant to the cutting face have involved, for example, the use of customized drive spindles which include provisions to deliver the high pressure coolant through the spindle and through the tool, and the provision of a coolant collar which is positioned around the shaft of the tool holder and delivers pressurized coolant radially through the collar and radially into the shaft for axial movement down the shaft to the cutting face. However, customized drive spindles are expensive and cumbersome and there are many environments where coolant flow cannot be accommodated through the drive spindle due to gearing or other obstructions. The separate cooling collars avoid the problems relating to the customizing of the drive spindles but necessarily employ seals at the interface of the collar and the shaft driving the tool and these seals, since they are placed under heavy loads because of shaft runout, present leakage problems and require replacement after relatively short periods of usage.

SUMMARY OF THE INVENTION

This invention is directed to the provision of an improved rotary tool holder.

More specifically, this invention is directed to the provision of a rotary tool holder which provides precision guidance for the rotary tool and includes provision for accommodating the delivery of a high pressure coolant to the cutting face.

Yet more specifically, this invention is directed to the provision of a rotary tool holder which provides for the delivery of high pressure coolant to the cutting face and which ensures that the tool shaft rotates precisely and concentrically within the high pressure seals associated with the coolant delivery so as to ensure effective sealing and long seal life.

The tool holder according to the invention is adapted to be received in a bushing plate and is adapted to receive a rotary tool at one end thereof. The tool holder includes a tubular shell adapted to be non-rotatably mounted in the bushing plate and having a radial port therein; a shaft mounted rotatably within the shell and having an axial bore and a radial port extending between the axial bore and the outer diameter of the shaft and disposed in axial alignment with the shell radial port so that the radial ports align with each rotation of the shaft within the shell to form coolant passage extending between the exterior of the shell and the axial bore of the shaft; and bearing members interposed at the rotating interface between the shell and the shaft. This arrangement maintains the shaft in a precise concentric relationship within the shell and facilitates the delivery of a pressurized coolant through the shell and through the shaft to the cutting face.

According to a further feature of the invention, the shell includes a reduced diameter pilot portion sized to be received in the bushing plate and a enlarged diameter collar portion adjoining the pilot portion; an annular space is defined between the shell and the shaft; the shell port extends radially through the collar portion and opens at its radially inner end in the annular space; the bearing members are provided in the annular space proximate the pilot portion; and a pair of annular seals are positioned in the annular space proximate the collar portion at opposite sides of the shell port in sealing engagement with the outer diameter of the shaft and the inner diameter of the shell collar portion. This arrangement allows the shell and shaft to be effectively sealed in the vicinity of the high pressure coolant passage and allows the seals to run under an even loading so as to improve the effectiveness of the seals and improve seal life.

According to a further feature of the invention, the collar portion is proximate one end of the shell and the pilot portion extends from the collar portion to the other end of the shell. This specific constructional arrangement allows the shell to be reciprocally received within the bushing plate while allowing ready access to the collar portion of the shell for purposes of delivering high pressure coolant to the cutting face.

According to a further feature of the invention, the annular space is closed at the collar portion end of the shell by a washer encircling the shaft and positioned adjacent the annular end face of the collar portion. This arrangement provides a convenient means of mounting the shell on the shaft and facilitating the closure of the annular space between the shell and the shaft and the positioning of the seals within the annular space between the collar portion and the shaft.

According to a further feature of the invention, the bearing members comprise needle bearings positioned in the annular space within the pilot portion. The needle bearings provide a ready and effective means of providing low friction rotation of the shaft within the shell while maintaining the shaft in a precise concentric relationship with respect to the shell so as to provide uniform, constant loading on the seals.

BRIEF DESCRIPTION OF THE DRAWINGS

FIG. 1 is a view, partially in section, of the rotary tool holder of the invention;

FIG. 2 is a detail view taken within the circle 2 of FIG. 1; and

FIG. 3 is a view showing the rotary tool holder of the invention utilized in a typical production machinery application.

DESCRIPTION OF THE PREFERRED EMBODIMENT

The rotary tool holder 10 seen in FIG. 1, broadly considered, includes a shell 12 and a shaft 14, both of which may be formed for example from heat treated tool steel.

Shell 12 has a cylindrical tubular configuration and includes a reduced diameter pilot portion 12a and an enlarged diameter collar portion 12b. Collar portion 12b is formed proximate the rear end of the shell 12 and pilot portion 12a extends from collar portion 12b to the front end of the shell. A continuous cylindrical through bore 12c extends from front to rear of the shell. Collar portion 12b defines a front annular face 12d and a rear annular face 12e. A radial bore or port 12f is provided in collar portion 12b and opens in the central bore 12c, and a threaded counter bore 12g communicates at its lower end with bore 12f and opens at its upper end in the outer peripheral face 12h of the collar portion.

An NPT fitting 16 is mounted on the collar portion and includes a threaded nipple port 16a threadably received in threaded counter bore 12g and a main body hex head portion 16b defining a threaded central bore 16c for threaded receipt of a suitable pipe 18.

Pilot portion 12a includes a lubricant hole 12i and a chamfered surface 12j at the front end of the shell.

Shaft 14 includes a shank portion 14a and a main body portion 14b.

Shank portion 14a includes a Woodruff keyway 14c proximate the rear end thereof and an externally threaded portion 14d extending forwardly from the Woodruff key.

A central bore 14e extends axially through the shaft 14 and includes a conically tapered portion 14f proximate the front end of the shaft. Bore 14e is blocked at its rearward end by a threaded plug 19. The front end of the shaft further defines a flange portion 14g including an annular rear shoulder 14h.

As best seen in FIG. 1, shaft 1 4 is positioned concentrically and rotatably within shell 12 with the front annular edge of the shell positioned against shoulder 14h to define the relative axial positions of the shell and the shaft. The outer diameter of the shaft is less than the diameter of shell bore 12c so as to define an annular space 20 between the inner diameter of the shell and the outer diameter of the shaft.

A plurality of needle bearings 22 are arranged in the annular space 20 within pilot portion 12a and a spacer 24 is fitted around the main body portion 14b of the shaft to properly position the needle bearings within the space 20. A bronze step washer 25 is positioned around shaft main body portion 14b with its inboard annular face 25a pressed against annular face 12e of shell collar portion 12b and with the step portion 25b of the washer extending into the rear end of annular space 20. A steel washer 26 is positioned outboard of bronze washer 25 and a snap ring 28 is mounted on shaft 14 to coact with shoulder 14h to preclude axial movement of the shell on the shaft.

A further snap ring 30 is positioned on shaft main body portion 14b immediately rearwardly of the rearwardmost needle bearing 22 and a ring 32 encircles the shaft immediately rearwardly of snap ring 30.

A pair of annular Teflon seals 34,35 are positioned in annular space 20 within shell collar portion 12b on opposite sides of radial port 12f. Seals 34,35 sealingly engage at their radially outer peripheries with bore 12c and sealingly engage at their radially inner peripheries with the outer periphery of shaft main body portion 14b.

An annular bronze spacer 36 is positioned in space 20 between the inboard ends of seals 34,35 to maintain the seals in their axially spaced position. Spacer 36 includes a radial port 36a aligned with collar portion port 12f. The annular shaft surfaces 14m on which seals 34,35 are mounted preferably are provided with a ceramic anti-wear coating 38 applied for example by the use of a plasma torch.

Main body 14b of shaft 14 includes a diametric bore 14i extending through shaft main body 14b and intersecting central bore 14e to form a pair of opposed radial ports 14j and 14k. Ports 14j and 14k are axially aligned with collar port 12f and spacer port 36a.

The invention rotary tool holder is seen in FIG. 3 in a typical machine tool application. Specifically, pilot portion 12a of shell 12 is slidably received in a bushing plate 40, shank portion 14a of shaft 14 is drivingly coupled to a drive spindle 42 by the use of a Woodruff key engaging the shaft keyway 14c with a nut 44 threaded onto the threaded portion 14d of shaft shank portion 14a to secure the shaft 14 relative to the spindle, and a cutter 46 has its mounting or shank portion 46a received in tapered bore 14f of the shaft and extends forwardly from the shaft for cutting coaction with a workpiece 48. The cutter 46 illustrated includes a series of stepped cutting portions 46a, 46b, 46c, 46d and 46e and, in known manner, is capable of providing a successively counter bored and precisely machined aperture in the workpiece.

As will be understood, the spindle 42 is moved through a work stroke to move the cutter 46 into association with the workpiece with the stroking movement of the tool toward the workpiece being accommodated by sliding movement of pilot portion 12a of shell 12 in bushing plate 40. As the cutter reaches the workpiece, drive spindle 42 rotates to rotate shaft 14 within shell 12 and cause the cutter to perform a cutting operation on the workpiece with the cutter being successively advanced further and further into the workpiece to achieve the multi-step aperture in the workpiece as illustrated.

During the cutting operation, a suitable coolant is provided under high pressure through pipe 18 to the cutting face between the cutter 46 and the workpiece 48. Specifically, the high pressure fluid flows through the pipe 18 from a suitable source of pressurized fluid, flows through the fitting 16, through the bore 12f in the collar portion of the shell, through port 36a in spacer 36, through radial ports 14j and 14k, through shaft axial bore 14e, and through an axial bore 46f in the tool 46 to the cutting face where the pressurized fluid acts to cool the cutting face and the rotating tool and further acts to positively remove and break up the chips being formed at the cutting face. It will be understood that the tool is provided with axial flutes (not shown) to facilitate the axially rearward removal of the chips from the cutting face.

The delivery of pressure fluid to the cutting face in the path described is actually a pulsating delivery since radial ports 14j and 14k alternately communicate with the passage through the fitting 16. The speed of rotation of the shaft 14 is actually such that there is a continuous flow of coolant through the described passage with pressure spikes reflecting the periodic and successive alignment of the radial ports 14j and 14k with the passage through the fitting 16. The spikes or pulsations in the fluid delivery pattern are believed to facilitate and augment the chip removal and chip breakup operation of the invention device.

It will be seen that the bearings 22 ensure that the shaft rotates at all times precisely concentrically within the shell thereby providing an even distribution of load on the seals 34,35 so as to allow the seals to provide an effective seal for the coolant and so as to allow the seals to function effectively over long periods of tool usage.

The invention arrangement allows for a balanced rotation of the shaft because the bearing assembly is piloted in a support bushing, the coolant arrangement is part of the bearing assembly, and the shank of the tool holder is mounted in a spindle. Therefore, no parts of the tool holder are unsupported and no parts of the tool holder contribute to an unbalanced condition. The ceramic coating proximate the seals 34 and 35 further contributes to the extended life of the seals; the bearing assembly takes the torque of starts and stops of the spindle rather than the cooling mechanism; the bearings take any radial load caused by coolant piping lines or misalignment; and the shell precisely pilots the shaft portion of the tool holder at all times to provide a precision cut and to relieve unbalanced loading on the seals.

It will be seen that the invention rotary tool holder, in addition to providing a precise true cutting operation, also provides a simple and effective means of delivering pressurized coolant to the cutting face so as to maintain workable temperatures at the cutting face and so as to provide effective removal of the chips being formed at the cutting face. As compared to the prior art coolant inducers, there is no necessity to customize the drive spindle for each particular application and the load on the seals containing the coolant flow is uniform and evenly distributed so as to provide an extremely effective seal and extremely long seal life.

Whereas a preferred embodiment of the invention has been illustrated and described in detail it will be apparent that various changes may be made and disclosed embodiment Without departing from the scope or spirit of the invention.

I claim:

1. A tool holder adapted to be received in a bushing plate and adapted to receive a rotary tool at one end thereof, said tool holder comprising:

an elongated tubular shell adapted to be non-rotatably but slidably mounted in the bushing plate and having a radial port therein proximate one end thereof and defining an elongated uniform diameter cylindrical surface extending from a location proximate the other end thereof to a location proximate said radial port and having a length substantially exceeding its diameter so as to provide an elongated cylindrical pilot portion for sliding receipts in the bearing plate to guide the movement of the holder through a work stroke;

a shaft mounted rotatably within said shell and having an axial bore and a radial port extending between said axial bore and the outer diameter of said shaft and disposed in axial alignment with said shell radial port so that said radial ports align with each rotation of said shaft within said shell to form a coolant passage extending between the exterior of said shell and said axial bore of said shaft; and bearing members interposed at the rotary interface between said shell and said shaft within said pilot portion.

2. A tool holder according to claim 1 wherein:

said shell includes an enlarged diameter collar portion adjoining said pilot portion;

an annular space is defined between said shell and said shaft;

said shell port extends radially through said collar portion and opens at its radially inner end in said annular space; and a pair of annular seals are provided in said annular space proximate said collar portion at opposite sides of said shell port in sealing engagement with the outer diameter of said shaft and the inner diameter of said shell collar portion.

3. A tool holder according to claim 2 wherein:

said collar portion is at one end of said shell and said pilot portion extends from said collar portion to the other end of said shell.

* * * * *

UNITED STATES PATENT AND TRADEMARK OFFICE
CERTIFICATE OF CORRECTION

PATENT NO. : 5,037,250
DATED : 8/6/91
INVENTOR(S) : Kevin D. Kenny

It is certified that error appears in the above-identified patent and that said Letters Patent is hereby corrected as shown below:

On the title page item [73]Assignee; delete "Westinghouse Electric Corp., Pittsburgh, Pa." and insert -- Gatco, Inc. --.

On the title page item [56] insert --2,507,204.......5/50--
Giern et al.....77/62
Please insert -- 3,721,503  3/73
Johnson......408/238--

Under "Other Publications" insert --Valco Industrial Corp. Sales Brochure --.

On title page "Attorney, Agent, or Firm" delete "Louis T. Isaf" and insert -- Krass & Young --.

Col. 4, line 65, delete "alloWs" and insert --allows--.

Column 5, Line 27, Please delete "Without" and insert -- without --.

Signed and Sealed this

Twenty-second Day of December, 1992

Attest:

DOUGLAS B. COMER

Attesting Officer

Acting Commissioner of Patents and Trademarks